United States Patent
Osaka

(10) Patent No.: US 6,426,849 B1
(45) Date of Patent: Jul. 30, 2002

(54) FLEXIBLE DISK COMPRISING A MEMBER FOR FILLING UP A GAP BETWEEN A METAL HUB AND A JACKET CENTER HOLE WITHOUT REGULATING A MOVEMENT OF THE METAL HUB

(75) Inventor: Tomohiko Osaka, Tendo (JP)

(73) Assignee: Mitsumi Electric Co., Ltd., Chofu (JP)

( * ) Notice: Subject to any disclaimer, the term of this patent is extended or adjusted under 35 U.S.C. 154(b) by 53 days.

(21) Appl. No.: 09/608,482

(22) Filed: Jun. 30, 2000

(30) Foreign Application Priority Data

Jul. 2, 1999 (JP) ............................. 11-189296

(51) Int. Cl.$^7$ ............................................. G11B 23/03
(52) U.S. Cl. ....................................... 360/133
(58) Field of Search ......................... 360/133

(56) References Cited

U.S. PATENT DOCUMENTS 5,793,583 A * 8/1998 Oishi .......................... 360/133
6,285,529 B1 * 9/2001 Uwabo ....................... 360/133

FOREIGN PATENT DOCUMENTS

JP          11-045542          2/1999

OTHER PUBLICATIONS

From book entitled "The Whole of Floppy Disk Apparatus", by Shoji Takahashi, republished as the second edition by CQ Publishing Co., Ltd. on Jul. 10, 1990, title page, p. 160 and copyright page.

* cited by examiner

Primary Examiner—A. J. Heinz
(74) Attorney, Agent, or Firm—Frishauf, Holtz, Goodman & Chick, P.C.

(57) ABSTRACT

A flexible disk (10) comprises a magnetic recording medium (11) provided with a metal hub (16), a jacket consisting of upper and lower shells (12, 13) for receiving the magnetic recording medium, and upper and lower liners (14-1, 14-2) attached to inner surfaces of the upper and the lower shells, respectively. The lower shell (13) is provided with a jacket center hole (13b) to expose the metal hub on the exterior of the jacket. The lower liner has an inner peripheral part (14-2a) which is extended to a gap ($\delta D$) between the metal hub and the jacket center hole. The inner peripheral part has slits in a radial manner. In lie of the inner peripheral part, a flexible disk (10A) may further comprise an auxiliary liner (30), freely mounted on a lower liner (14A-2), for extending to the gap. In place of the auxiliary liner, the flexible disk may comprise a member for substantially filling up the gap without regulating a movement of the metal hub.

1 Claim, 10 Drawing Sheets

FLEXIBLE DISK COMPRISING A MEMBER FOR FILLING UP A GAP BETWEEN A METAL HUB AND A JACKET CENTER HOLE WITHOUT REGULATING A MOVEMENT OF THE METAL HUB

BACKGROUND OF THE INVENTION

This invention relates to a flexible or floppy disk (which may be abbreviated to "FD") for use in a removable type magnetic recording/reproducing device such as a flexible or floppy disk drive (which may be abbreviated to "FDD").

As is well known in the art, the flexible disk of the type described comprises a magnetic recording medium and a jacket for receiving the magnetic recording medium. The magnetic recording medium comprises a flexible thin sheet composed of synthetic resin, a magnetic recording layer formed on a surface of the flexible thin sheet, and a coating layer formed on the magnetic recording layer.

On the other hand, the flexible disk drive of the type described is an apparatus for carrying out data recording and reproducing operation to and from the magnetic recording medium of the flexible disk inserted or loaded therein. In recent years, the flexible disks are more and more improved to have a larger storage capacity. Specifically, development is made of the flexible disks having the storage capacity of 128 megabytes (which may be called large-capacity FDs) In contrast with the flexible disks having storage capacity of 1 megabytes or 2 megabytes (which may be called small-capacity FDs). Following such development, the flexible disk drives have also been improved to accept the large-capacity FDs for data recording and reproducing operations to and from the magnetic recording media of the large-capacity FDs. Furthermore, the large-capacity FDs are more improved to have a larger storage capacity of 256 Mbytes, 512 Mbytes, . . . , and so on.

Throughout the present specification, flexible disk drives capable of recording/reproducing data for magnetic recording media of the large-capacity FDs alone will be referred to as "high-density exclusive type FDDs." On the other hand, flexible disk drives capable of recording/reproducing data for magnetic recording media of the small-capacity FDs alone will be called "low-density exclusive type FDDs." Furthermore, flexible disk drives capable of recording/reproducing data for magnetic recording media of both the large-capacity and the small-capacity FDs will be called "high-density/low-density compatible type FDDs." In addition, the high-density exclusive type FDDs and the high-density/low-density compatible type FDDs will collectively be called "high-density type FDDS."

The low-density exclusive type FDD and the high-density type FDD are different in mechanism from each other in several respects, one of which will presently be described. In either FDD, a pair of magnetic heads is supported by a carriage which is driven by a drive arrangement to move in a predetermined radial direction with respect to the magnetic disk medium of the flexible disk loaded in the flexible disk drive. The difference resides in the structure of the structure of the drive arrangement. More specifically, the low-density exclusive type FDD uses a stepping motor as the drive arrangement. On the other hand, the high-density type FDD uses a linear motor such as a voice coil motor (which may be called "VCM" for short) as the drive arrangement.

Now, description will be made in slightly detail as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that the magnetic field generated by the magnetic circuit, a drive force occurs in a direction extending to the axis on the basis of interaction of the electric current with the magnetic field. The drive force causes the voice coil motor to move the carriage in the predetermined radial direction.

Another difference between the low-density exclusive type FDD and the high-density type FDD resides in the number of revolution of a spindle motor for rotating the magnetic recording medium of the flexible disk loaded therein. More specifically, the low-density exclusive type FDD may rotate the magnetic recording medium of the small-capacity FD loaded therein at a low rotation speed having the number of revolution of either 300 or 360. On the other hand, the high-density type FDD can admit, as the flexible disk to be loaded therein, either the large-capacity FD alone or both of the large-capacity FD and the small-capacity FD. As a result, when the large-capacity FD is loaded in the high-density type FDD, the spindle motor for the high-density type FDD must rotate the magnetic recording medium of the large-capacity FD loaded therein at a high rotation speed having the number of revolution of 3,600 rpm which is equal to ten or twelve times as large as that of the small-capacity FD.

In the meanwhile, the large-capacity FD generally has an external configuration identical with that of the small-capacity FD. Specifically, both of the large-capacity and the small-capacity FDs have a flat rectangular shape of a width of 90 mm, a length of 94 mm, and a thickness of 3.3 mm in case of a 3.5-inch type. However, the large-capacity FD has a narrower track width (track pitch) than that of the small-capacity FD. As a result, it is difficult for the large-capacity FD to position a magnetic head of the high-density type FDD on a desired track in the magnetic recording medium thereof in contrast with the small-capacity FD. Accordingly, a servo signal for position detection is preliminarily written in the magnetic recording medium of the large-capacity FD.

In addition, the flexible disk is called a disk cartridge in the manner known in the art. The disk cartridge comprises the magnetic recording medium, upper and lower shells for receiving the magnetic recording medium with a space left therebetween, an upper liner adhered to an inner surface of the upper shell, and a lower liner adhered to an inner surface of the lower shell. The magnetic recorded medium is disposed between the upper and the lower liners. A combination of the upper and the lower shells is referred to as the jacket. That is, the magnetic recording medium is received in the jacket The jacket is made by molding of synthetic resin. Specifically, the jacket comprises the combination of the upper and the lower shells each of which is generally made by injection molding.

The upper and the lower liners are for removing fine dust from adhered to upper and lower surfaces of the magnetic recording medium. Each of the upper and the lower liners is annular in shape and comprises a nonwoven fabric sheet which is made of, for example, rayon. The upper and the lower shells are provided with upper and lower rectangular head windows, respectively, to permit an access to the magnetic recording medium by a pair of magnetic heads.

The magnetic recording medium has an annular shape with a medium circular opening formed at its center to be concentric with a center axis of the magnetic recording medium. The magnetic recording medium is made of a magnetic material having a flexibility. That is, as described above, the magnetic recording medium comprises the flexible thin sheet composed of synthetic resin, the magnetic recording layer formed on the surface of the flexible thin sheet, and the coating layer formed on the magnetic recording layer. The magnetic recording medium is supported at the periphery of the medium circular opening by a metal hub through a double-sided adhesive tape called an A ring in the art.

The metal hub is generally made by press molding of a metal plate. Specifically, the metal hub has a substantially dish shape and comprises a concave portion at its center thereof and an outer circumferential portion at the periphery of the concave portion. That is, the concave portion consists of a cylindrical portion and a circular bottom portion. In addition, the outer circumferential portion is called a flange portion which is formed at the upper end of the cylindrical portion. The jacket or the lower shell has a shell circular opening or a jacket center circular hole serves to expose the concave portion of the metal hub to the exterior of the jacket. In addition, the metal hub serves to chuck the flexible disk at a disk holder table of the flexible disk drive. Specifically, the metal hub has a hub center hole formed at its center and a chucking hole formed at a position eccentric with the hub center hole. The disk holder table is rotatably driven by a spindle motor. The spindle motor comprises a spindle shaft to which the disk holder table is fixed at an upper portion thereof. The disk holder table is provided with a chucking pin formed thereon. The spindle shaft and the chucking pin are inserted to the hub center hole and the chucking hole to rotate the magnetic recording medium of the flexible disk in a predetermined rotation direction.

Inasmuch as the lower shell or the jacket has the jacket center circular hole, there is a gap between the metal hub and the jacket center circular hole. It is difficult to completely get rid of the gap from a point of view for preventing a collision between the metal hub and the jacket on relative rotation therebetween when the magnetic recording medium of the flexible disk is accessed by the magnetic heads. The gap is equal to about 1 mm.

With structure of the above-mentioned conventional flexible disk, a small amount of dust may intrude or invade in the jacket via the gap. In a special case where the flexible disk is the large-capacity FD, a rotating magnetic recording medium winds up the dust in the circumference in accordance with a similar principle in a tornade because the magnetic recording medium rotates at a very high rotation speed of 3600 rpm as mentioned before. That is, the large-capacity FD swallows up, in the jacket via the jacket center circular hole, not only dust near to the jacket center circular hole but also dust far from the jacket center circular hole by rotating the magnetic recording medium at the high rotation speed.

That is, the conventional flexible disk is disadvantageous in that a reading error and a writing error tends to occur due to presence of the dust intruded via the gap when the magnetic recording medium is accessed by the magnetic heads of the flexible disk drive.

In order to resolve this problem, Japanese Unexamined Patent Publication of Tokkai No. Hei 11-45,540 or JP-A 11-45540 discloses or provides a flexible disk which is capable of preventing dust from intruding in the jacket via the gap between the metal hub and the jacket center circular hole. In the manner which will later be described in conjunction with FIG. 4, the flexible disk according to JP-A 11-45540 comprises the lower liner which has an inner peripheral part extended to the gap between the metal hub and the jacket center circular hole. That is, the lower liner has a liner opening of a liner opening diameter which is smaller than a jacket opening diameter of the jacket center circular hole so as to bring the liner opening diameter near a cylindrical outer diameter of the metal hub as much as possible.

However, a free movement of the metal hub may be regulated if the inner peripheral part of the lower liner is too close to the cylindrical portion of the metal hub. This is because the lower liner is adhered to the inner surface of the lower shell. When the movement of the metal hub is regulated, a chucking error or the like tends to occur. As a result, it is difficult for the flexible disk according to JP-A 11-45540 to bring the inner peripheral part of the lower liner near the cylindrical portion of the metal hub.

SUMMARY OF THE INVENTION

It is therefore an object of the present invention to provide a flexible disk which is capable of preventing dust from intruding in a jacket without regulating a movement of a metal hub.

Other objects of this invention will become clear as the description proceeds.

On describing the gist of an aspect of this invention, it is possible to be understood that a flexible disk comprises a generally disk-shaped sheet-like magnetic recording medium, a jacket consisting of upper and lower shells for receiving the magnetic recording medium so that the magnetic recording medium is rotatable, and generally annular upper and lower liners attached to inner surfaces of the upper and the lower shells, respectively. The magnetic recording medium is provided with a rotation supporting metal hub attached to a center portion thereof. The lower shell is provided with a jacket center circular hole to expose the metal hub on the exterior of the jacket.

According to a first aspect of this invention, the above-mentioned lower liner has an inner peripheral part which is extended to a gap between the metal hub and the jacket center circular hole. The inner peripheral part has slits in a radial manner.

According to a second aspect of this invention, the above-understood flexible disk further comprises an annular auxiliary liner, freely mounted on the lower liner, for extending to a gap between the metal hub and the jacket center circular hole.

According to a third aspect of this invention, the above-understood flexible disk further comprises a member for substantially filling up a gap between the metal hub and the jacket center circular hole without regulating a movement of the metal hub.

DESCRIPTION OF THE PREFERRED EMBODIMENT

Figure 1:
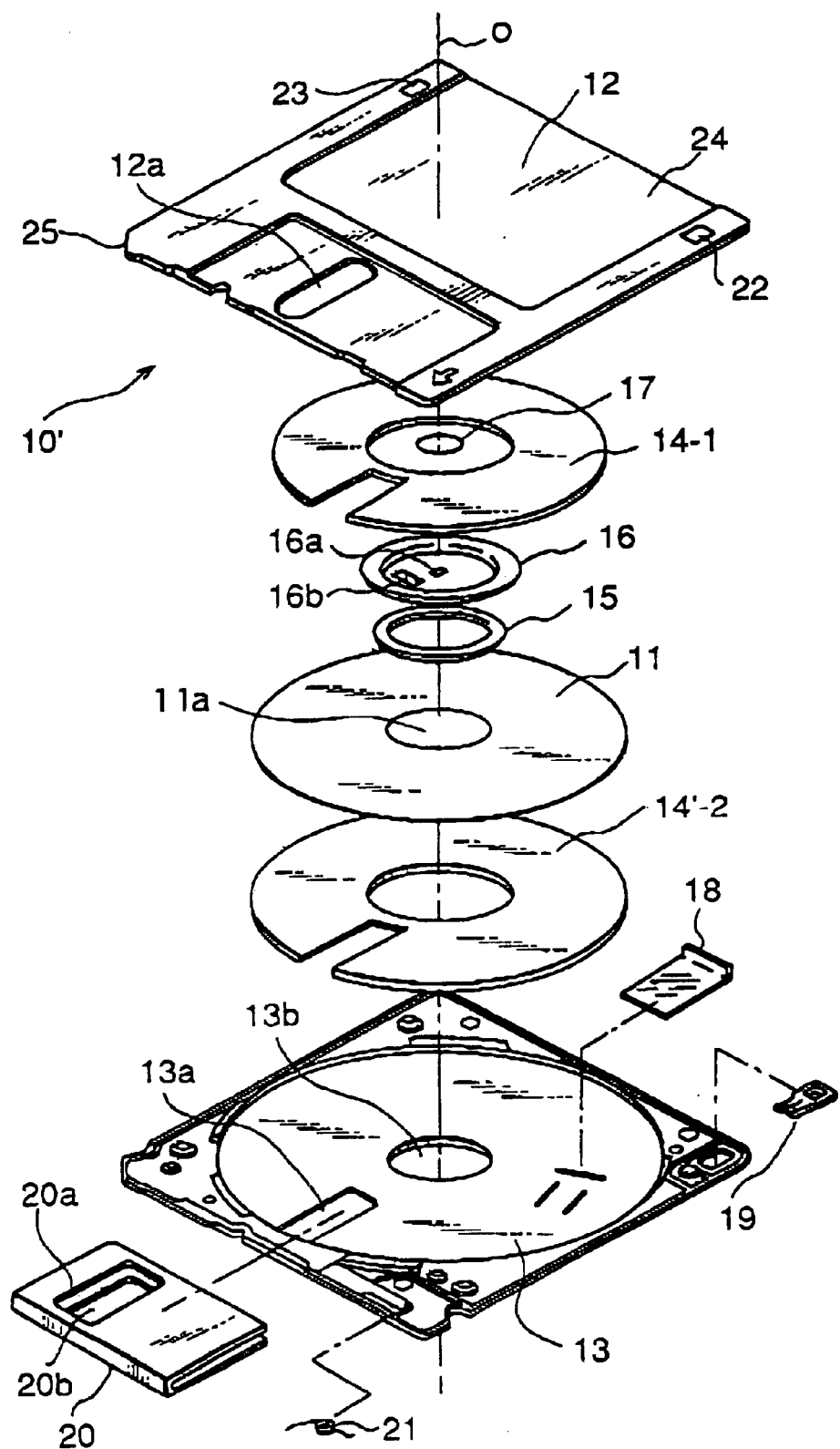
FIG. 1 is an exploded perspective view showing a conventional flexible disk (small-capacity FD)

Referring to FIG. 1, a conventional flexible disk 10' or disk cartridge will be described at first in order to facilitate an understanding of the present invention. In the example being illustrated, the flexible disk 10' or disk cartridge is a 3.5-inch floppy disk. Such a floppy disk is disclosed in Japanese book entitled "The Whole of Floppy Disk Apparatus" written by Shoji Takahashi and published as the second edition by CQ publishing Co., Ltd. on Jul. 10, 1990, page 160.

As shown in FIG. 1, the flexible disk 10' comprises a magnetic recording medium 11, an upper shell 12, a lower shell 13, an upper liner 14-1 adhered to an inner surface of the upper shell 12, and a lower liner 14'-2 adhered to an inner surface of the lower shell 13. The magnetic recording medium 11 is disposed or received between the upper and the lower liners 14-1 and 14'-2. Herein, a combination of the upper shell 12 and the lower shell 13 will be referred to as a jacket. That is, the magnetic recording medium 11 is received in the jacket.

The jacket is made by molding of synthetic resin. Specifically, the jacket is composed of the combination of the upper shell 12 and the lower shell 13 each of which is generally made by injection molding.

The upper and the lower liners 14-1 and 14'-2 serve to remove fine dust attracted to an upper surface and a lower surface of the magnetic recording medium 11, respectively. Each of the upper and the lower liners 14-1 and 14'-2 is annular in shape and comprises a nonwoven fabric sheet which is made of, for example, rayon. The jacket is provided with a head window to enable an access by a pair of magnetic heads (not shown) of a flexible disk drive (not shown in FIG. 1) which will later be described. Specifically, the head window is composed of upper and the lower head windows 12a and 13a as rectangular holes formed in the upper and the lower shells 12 and 13, respectively.

The magnetic recording medium 11 has an annular shape with a medium circular opening 11a formed at its center to be concentric with a center axis O of the magnetic recording medium 11. The magnetic recording medium 11 is made of a magnetic material having a flexibility. That is, the magnetic recording medium 11 comprises the flexible thin sheet composed of synthetic resin, magnetic recording layers formed on both surfaces of the flexible thin sheet, and coating layers formed on the magnetic recording layers. The magnetic recording medium 11 is supported at the periphery of the medium circular opening 11a by a metal hub 16 through a double-sided adhesive tape 15 called an A ring.

A center plate 17 is interposed between the metal hub 16 and the upper shell 12. To the lower shell 13, a lifter 18 and a write protector 19 are attached. The lifter 18 serves to press the lower liner 14'-2 against the magnetic recording medium 11. The lower shell 13 is provided with a shell circular opening or a jacket center circular hole 13b which serves to expose a bottom portion of the metal hub 16 to the exterior of the jacket.

The flexible disk 10' further comprises a metal shutter 20 for opening and closing the upper and the lower head windows 12a and 13a. The metal shutter 20 is usually made by folding of a metal plate. The shutter 20 is closed when the flexible disk 10' is not loaded in the flexible disk drive. This prevents fine dust and various contaminants from entering into the jacket and makes it difficult for an operator's finger to erroneously touch a recording surface of the magnetic recording medium 11. The shutter 20 has a shutter window for bringing the upper and the lower head windows 12a and 13a into an open state. Specifically, the shutter window has an upper shutter window 20a as a rectangular hole formed in an upper plate of the shutter 20 at a position corresponding to the upper head window 12a, and a lower shutter window 20b as a rectangular hole formed In a lower plate of the shutter 20 at a position corresponding to the lower head window 13a. The shutter 20 is urged by a shutter spring 21 attached to the lower shell 13 in a closing direction.

The metal hub 16 serves to chuck the flexible disk 10' at a disk holder table (not shown) of the flexible disk drive. Specifically, the metal hub 16 has a hub center hole 16a formed at its center and a chucking hole 16b formed at a position eccentric with the hub center hole 16a. The disk holder table is rotatably driven by a spindle motor (not shown). The spindle motor comprises a spindle shaft (not shown) to which the disk holder table is fixed at an upper portion thereof. The disk holder table is provided with a chucking pin (not shown) formed thereon. The spindle shaft and the chucking pin are inserted to the hub center hole 16a and the chucking hole 16b to rotate the magnetic recording medium 11 of the flexible disk 10' in a predetermined rotation direction.

A write protector 19, which is called a write protect tab, serves to switch opened/closed states of a write protect hole 22 formed in the jacket to inhibit a writing operation. When the write protect hole 22 is closed and opened by moving the write protector 19, the flexible disk 10' is put into a write enable state and a write inhibit state, respectively. The jacket is further provided with a hole 23 to identify the flexible disk as a high-density (HD) type. The upper shell 12 has a label area 24 formed on an upper surface thereof. In addition, the jacket has a chamfered portion 25 for preventing reverse insertion (wrong insertion in an insertion direction with respect to inside and outside and to before and behind) at a right-hand and upper corner part of the insertion direction.

It is noted here that the flexible disk 10' illustrated in FIG. 1 has a normal or small storage capacity of 1 megabyte or 2 megabytes. A large-capacity floppy disk having a storage capacity of as large as 128 megabytes does not include the lifter 18.

Figure 2A:
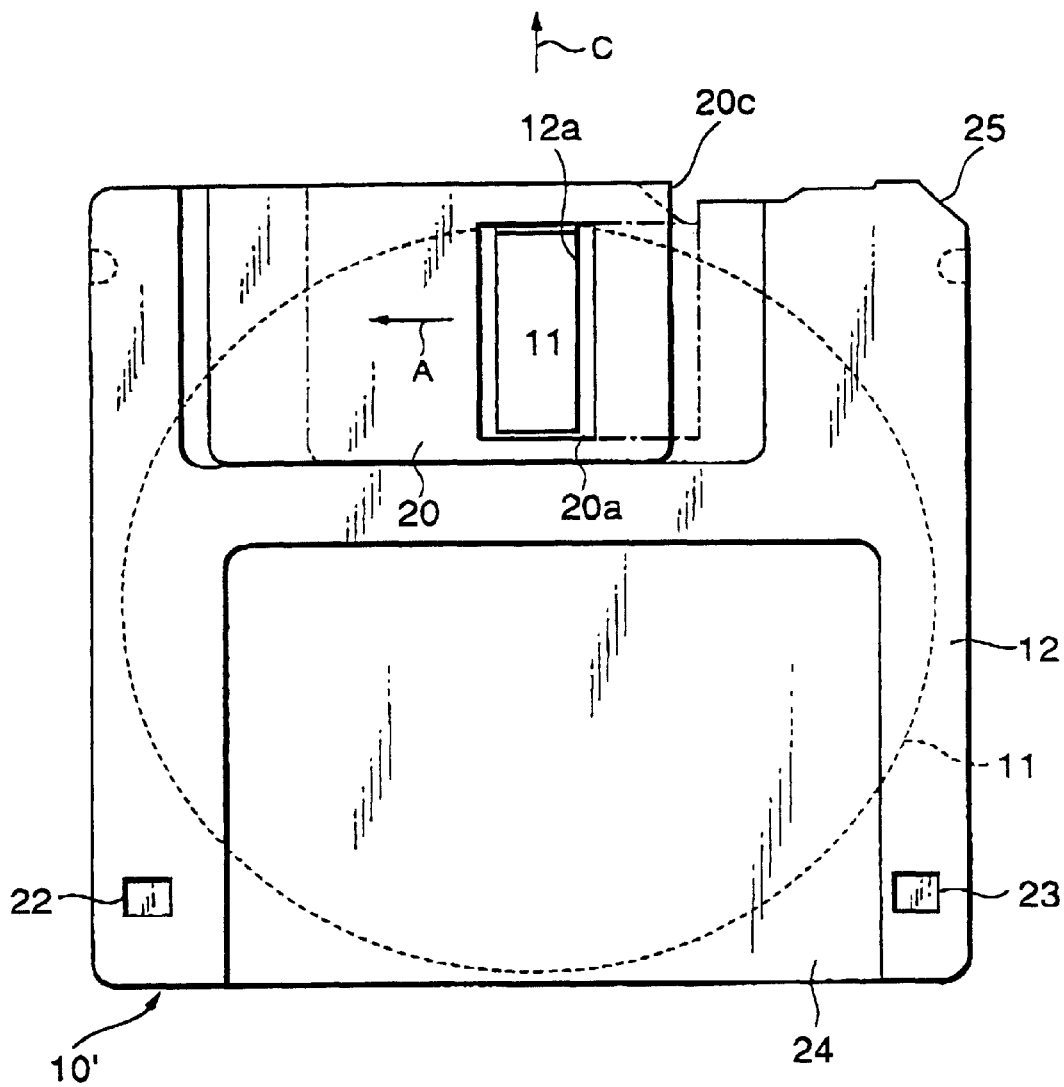
FIGS. 2A and 2B collectively show an external appearance of the small-capacity FD illustrated in FIG. 1.
Figure 2B:
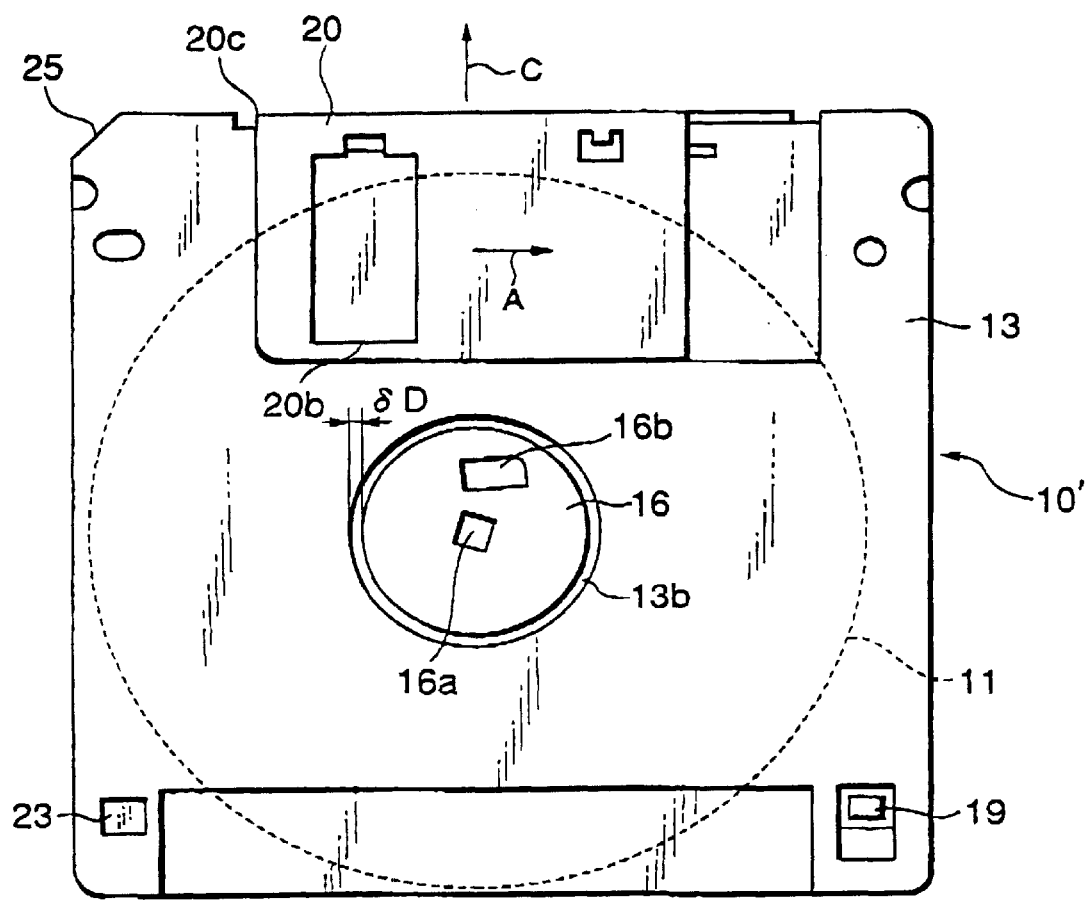

FIGS. 2A and 2B collectively show an external appearance of the flexible disk 10' illustrated in FIG. 1. FIG. 2A is a plan view of the flexible disk 10' as seen from an upper surface side while FIG. 2B is a bottom view of the flexible disk 10' as seen from a lower surface side.

Figure 3:
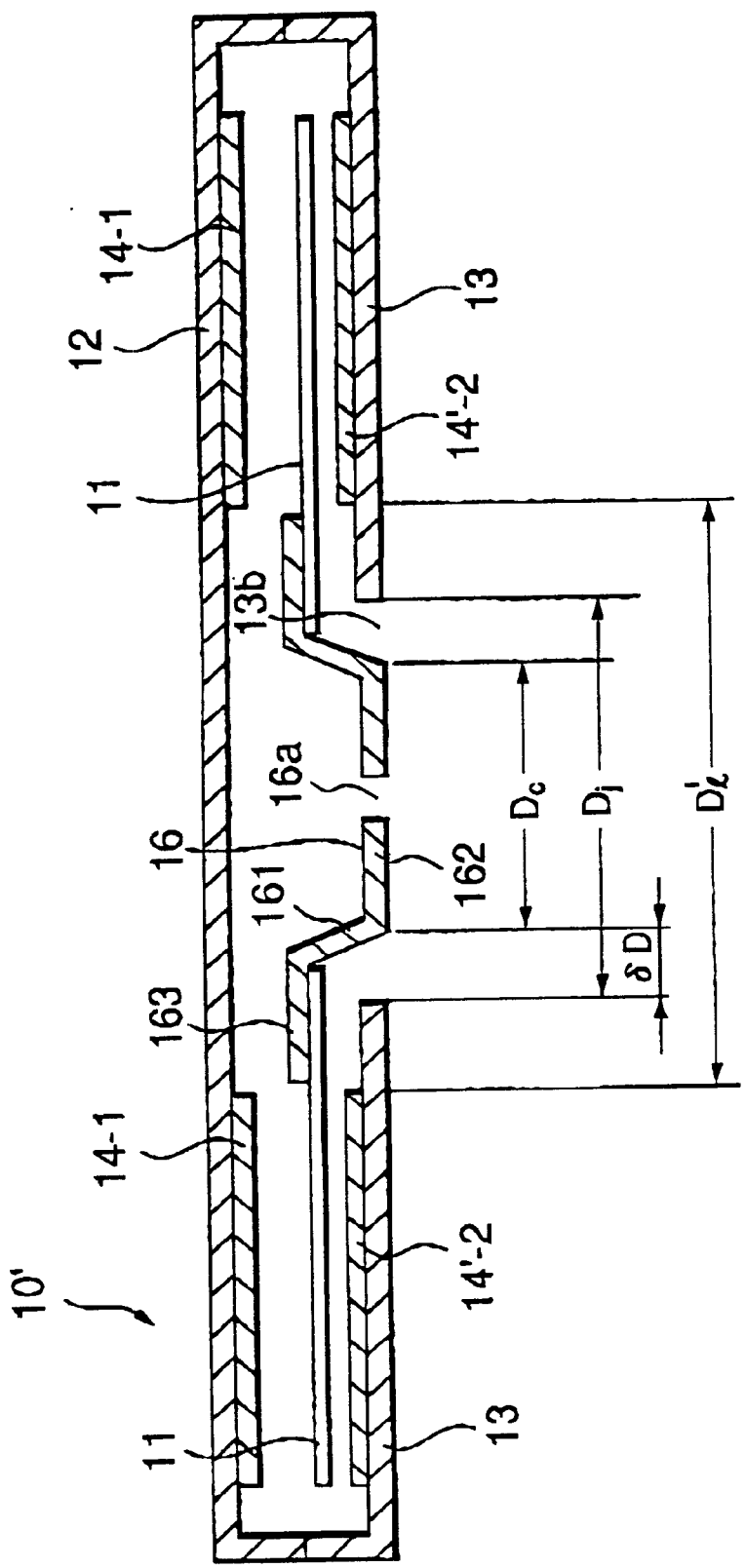
FIG. 3 is a sectional view of the small-capacity FD illustrated in FIG. 1.

FIG. 3 is a sectional view of the flexible disk 10' illustrated in FIG. 1. The metal hub 16 is generally made by press molding of a metal plate. Specifically, the metal hub 16 has a substantially dish shape and comprises a concave portion at its center thereof and an outer circumferential portion 163 at the periphery of the concave portion. That is, the concave portion consists of a cylindrical portion 161 and a circular bottom portion 162. In addition, the outer circumferential portion 163 is called a flange portion which is formed at the upper end of the cylindrical portion 161.

As shown in FIG. 3, the cylindrical portion 161 of the metal hub 16 has a cylindrical outer diameter depicted at $D_c$ while the jacket center circular hole 13b of the lower shell 13 has a jacket opening diameter depicted at $D_j$. In addition, the lower liner 14'-2 has a liner opening of a liner opening diameter depicted at $D'_l$. The jacket opening diameter $D_j$ is larger than the cylindrical outer diameter $D_c$ of the metal hub 16 and is smaller than the liner opening diameter $D'_l$. In other words, there is a gap δD between the metal hub 16 and the jacket center circular hole 13b as also apparent from FIG. 2B. It is difficult to completely get rid of the gap δD from a point of view for preventing a collision between the metal hub 16 and the jacket on relative rotation therebetween when the magnetic recording medium 11 of the flexible disk 10' is accessed by the magnetic heads. The gap δD is equal to about 1 mm.

With structure of the above-mentioned conventional flexible disk 10', a small amount of dust may intrude or invade in the jacket via the gap δD. In a special case where the flexible disk is the large-capacity FD, a rotating magnetic recording medium winds up the dust in the circumference in accordance with a similar principle in a tornade because the magnetic recording medium rotates at a very high rotation speed of $3,600$ rpm as mentioned before. That is, the large-capacity FD swallows up, in the jacket via the jacket center circular hole 13b, not only dust near to the jacket center circular hole 13b but also dust far from the jacket center circular hole 13b by rotating the magnetic recording medium 11 at the high rotation speed.

That is, the conventional flexible disk 10' is disadvantageous in that a reading error and a writing error tends to occur due to presence of the dust intruded via the above-mentioned gap δD when the magnetic recording medium 11 is accessed by the magnetic heads of the flexible disk drive, as mentioned in the preamble of the instant specification.

Figure 4:
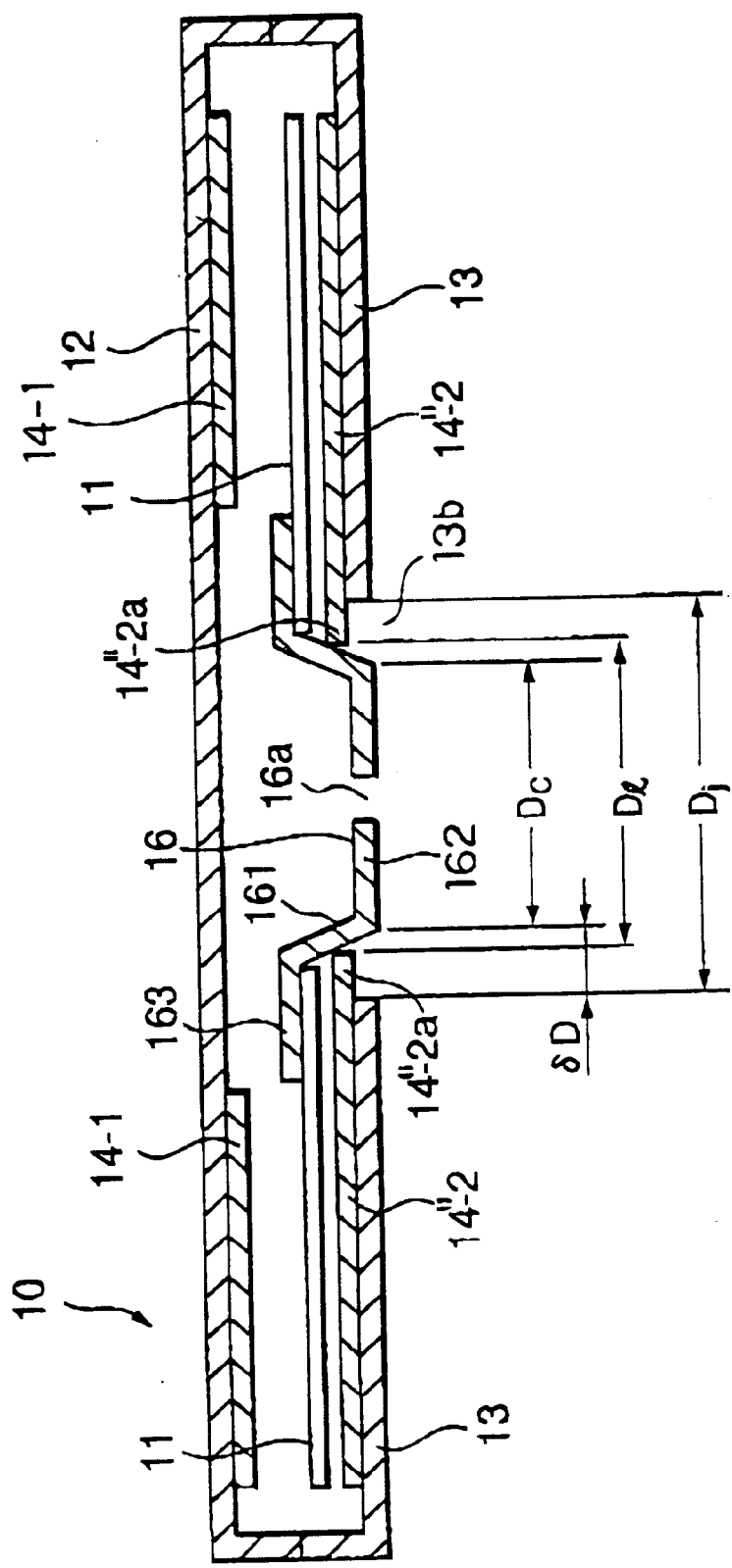
FIG. 4 is a sectional view of another conventional flexible disk.

In order to resolve this problem, the above-mentioned JP-A 11-45540 discloses or provides a flexible disk 10'' which is capable of preventing dust from intruding in the jacket via the gap δD between the metal hub 16 and the jacket center circular hole 13b as illustrated in FIG. 4. The illustrated flexible disk 10'' comprises a lower liner 14''-2 which has an inner peripheral part 14''-2a extended to the gap δD between the metal hub 16 and the jacket center circular hole 13b. That is, the lower liner 14''-2 has a liner opening of a liner opening diameter $D_l$ which is smaller than the jacket opening diameter $D_j$ of the jacket center circular hole 13b so as to bring the liner opening diameter $D_l$ near the cylindrical outer diameter $D_c$ of the metal hub 16 as much as possible.

However, a free movement of the metal hub 16 may be regulated if the inner peripheral part 14''-2a of the lower liner 14''-2 is too close to the cylindrical portion 161 of the metal hub 16. This is because the lower liner 14''-2 is adhered to the inner surface of the lower shell 13. When the movement of the metal hub 16 is regulated, a chucking error or the like tends to occur. As a result, it is difficult for the flexible disk 10'' illustrated in FIG. 4 to bring the inner peripheral part 14''-2a of the lower liner 14''-2 near the cylindrical portion 161 of the metal hub 16, as mentioned also in the preamble of the instant specification.

Figure 5:
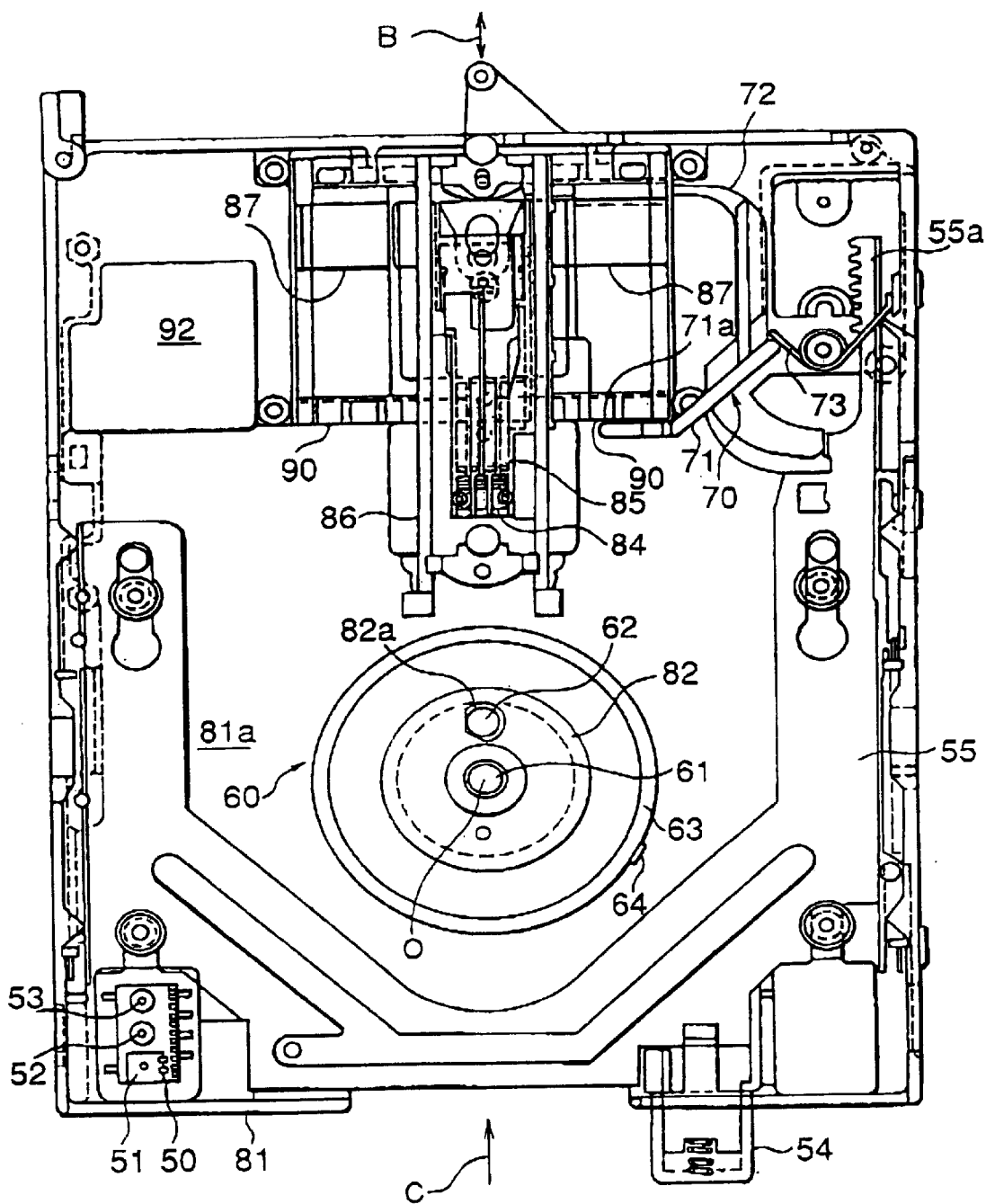
FIG. 5 is a plan view of a high-density/low-density compatible type flexible disk drive (FDD) which can access a flexible disk (large-capacity FD) according to this invention.

Referring to FIG. 5, description will proceed to a flexible disk drive which can access a flexible disk according to an embodiment of this invention. The illustrated flexible disk drive is a high-density/low-density compatible type FDD which enable to carry out recording/reproducing of data for magnetic recording media of both a large-capacity flexible disk (FD) (which will later be described) and a small-capacity flexible disk (FD). FIG. 5 is a plan view showing the high-density/low-density compatible type FDD. The flexible disk is loaded into the high-density/low-density compatible type FDD from an insertion direction indicated by an arrow C in FIG. 5. FIG. 5 shows a state where the flexible disk is loaded into the high-density/low-density compatible type FDD. The flexible disk has a disk center axis (not shown).

The high-density/low-density compatible type FDD comprises a main frame 81 having a main surface 81a and a disk holder table 82 which is rotatably supported on the main surface 81a of the main frame 81. The disk holder table 82 has a table center axis O which acts as the axis of the rotation. The loaded flexible disk is held on the disk holder table 82 so that the table center axis O coincides with the disk center axis. The disk holder table 82 is rotatably driven by a spindle motor (SPM) 60. The spindle motor 60 is mounted on the main frame 81 with the spindle motor 60 put into a state embedded in a concave portion (not shown) of the main frame 81, thereby the magnetic recording medium of the flexible disk rotates at a desired rotation speed in the manner which will become clear. In addition, the main frame 81 has a back surface (not shown) on which a printed-circuit board 92 is mounted. A number of electronic parts (not shown) are mounted on the printed-circuit board 92.

As shown in FIG. 5, the spindle motor 60 is mounted on the main surface 81a with the spindle motor embedded in the concave portion of the main frame 81. The spindle motor 60 comprises a spindle shaft 61 which is rotatably supported with respect to the main frame 81 via a ball bearing (not shown) substantially perpendicular to the main surface 81a of the main frame 81. The spindle shaft 61 serves as the axis O of the rotation for the magnetic recording medium of the flexible disk loaded in the high-density/low-density compatible type FDD. The disk holder table 82 is fixed to the spindle shaft 61 at an upper portion thereof. The disk holder table 82 has a main surface which extends to a direction perpendicular to a longitudinal direction (a direction of the axis O of the rotation) of the spindle motor 61.

That is, the disk holder table 82 is rotatably supported on the main surface 81a of the main frame 81 and holds the flexible disk loaded in the high-density/low-density compatible type FDD so that the table center axis O (the axis of the rotation) coincides with the disk center axis of the flexible disk.

The high-density/low-density compatible type FDD comprises a pair of magnetic heads (not shown) for reading/writing data from/to the magnetic recording medium in the flexible disk. The magnetic heads are supported via gimbals 84 with a carriage 85. A combination of the gimbals, the carriage 85, voice coils 87 (which will later be described), a flexible printed circuit (FPC), a scale, a spring holer, and a spring is called a carriage assembly. The carriage 85 is disposed over the main surface 81a of the main frame 81 with a space left therebetween. The carriage 85 supports the magnetic heads movably along a predetermined radial direction (i.e. a direction indicated by an arrow B in FIG. 5) with respect to the flexible disk.

The carriage 85 is supported and guided at both lower sides thereof by a pair of guide bars 86 which extend to directions in parallel with the predetermined radial direction B. The carriage assembly is driven in the predetermined radial direction B by a voice coil motor (VCM) which will presently be described. As shown in FIG. 5, the carriage assembly is provided with a pair of the voice coils 87 at opposite rear sides thereof. The voice coils 87 act as components of the voice coil motor.

Now, description will be made as regards the voice coil motor (VCM). The voice coil motor comprises the pair of voice coils 87 and a pair of magnetic circuits 90. The pair of voice coils 87 is located at the opposite rear sides of the carriage assembly and is wounded around drive axes (not shown) parallel to the predetermined radial direction B. The par of magnetic circuits 90 is for producing magnetic fields intersecting electric currents flowing through the voice coils 87. In the voice coil motor of the above-mentioned structure, when the electric current is made to flow through each of the voice coils 87 in a direction intersecting the magnetic field produced by the magnetic circuits 90, a drive force is generated in an extending direction of each drive axis as a result of interaction between the electric current and the magnetic field. The drive force causes the voice coil motor to make the carriage assembly move in the predetermined radial direction B.

Figure 6A:
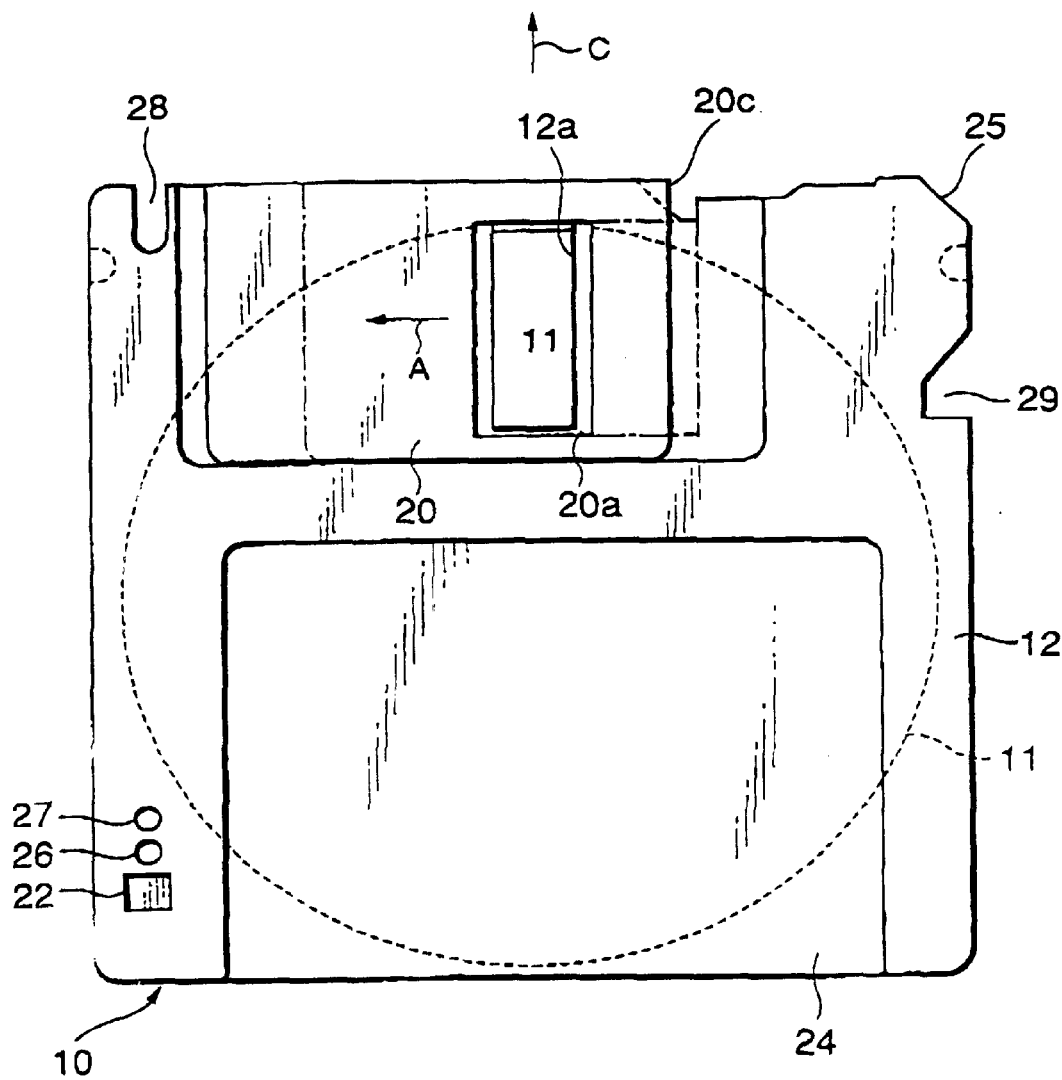
FIGS. 6A and 6B collectively show the large-capacity FD according to a first embodiment of this invention.
Figure 6B:
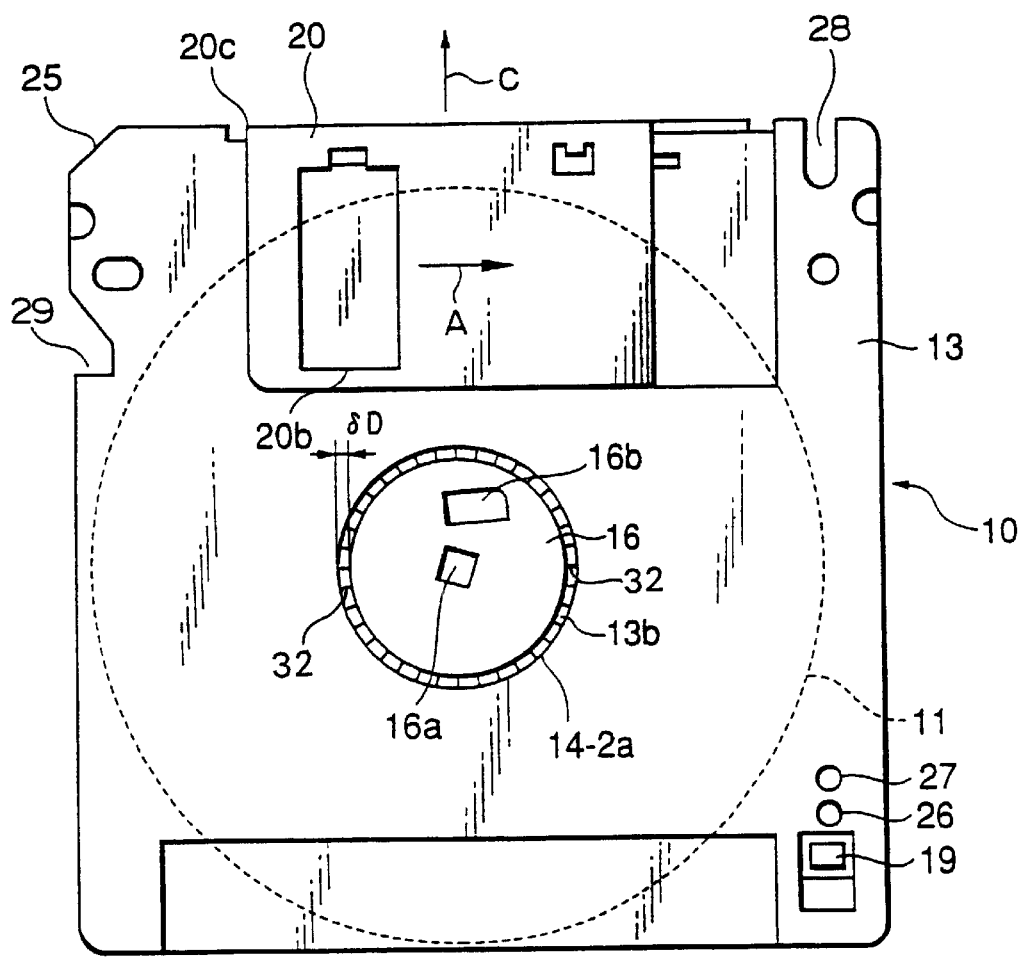

Turning to FIG. 6A and 6B, description will proceed to the large-capacity FD 10 to which this invention is applicable. FIG. 6A is a plane view of the large-capacity FD 10 as seen from an upper surface side while FIG. 6B is a bottom view of the large-capacity FD 10 as seen from a lower surface side. The illustrated large-capacity FD 10 has an external form which is substantially similar to the small-capacity FD 10' illustrated in FIGS. 2A and 2B. The large-capacity FD 10 comprises the magnetic recording medium 11 and the jacket for receiving or covering the magnetic recording medium 11. The jacket consists of an upper shell 12 (FIG. 6A) having the upper surface and a lower shell 13 (FIG. 6B) having the lower surface.

As shown in FIG. 6B, in the lower shell 13, the jacket center circular hole 13b is formed at a center portion of the large-capacity FD 10. In the jacket center circular aperture 13b is freely received the metal hub 16 for supporting the magnetic recording medium 11. The metal hub 16 has a hub center hole 16a at a center portion thereof and a chucking hole 16b at a position eccentric with the center position thereof. In this specification, a combination of the magnetic recording medium 11 and the metal hub 16 is merely called a "medium." The hub center hole 16a has substantially a rectangular shape and receives the above-mentioned spindle shaft 61 (FIG. 5). The chucking hole 16b freely receives a chucking pin or a drive roller 62 (FIG. 5).

Turning back to FIG. 5 again in addition to FIG. 6B, the disk holder table 82 has a table diameter which is larger than that of the metal hub 16 and which is smaller than that of the jacket center circular hole 13b of the jacket.

The disk holder table 82 has a table driving oval hole 82a at a position corresponding to the chucking hole 16b. Through the table driving oval hole 82a, the chucking pin 62 is freely received in the chucking hole 16b of the flexible disk 10. The disk holder table 82 is mounted on a magnetic case 63 at a bottom surface thereof. The chucking pin 62 is rotatably and movably mounted in the magnetic case 63 with the chucking pin 62 urged upwardly. Accordingly, the chucking pin 62 moves downwardly or sinks in the disk holder table 82 if any load is applied to the chucking pin 62 downwards. The magnetic case 63 comprises a circumferential wall (not shown) having an outer surface at a predetermined position of which an index detection magnet 64 of rectangular parallelepiped shape is fixed.

Referring to FIGS. 6A and 6B again, a write protection hole 22 is bored in the jacket of the large-capacity FD 10 at a corner portion in rear and right-hand side with respect to the insertion direction C of FIG. 6B as view from the lower shell 13. In other words, the write protection hole 22 is bored in the jacket of the large-capacity FD 10 at the corner portion in rear and left-hand side in the insertion direction C of FIG. 6A as viewed from the upper shell 12. FIG. 6B shows a state where the write protection hole 22 is shut by a write protection tab 19. The write protection tab 19 manually enables to slide along a direction in parallel with the insertion direction C. It is possible to carry out opening and closing of the write protection hole 22 by operating the write protection tab 19 manually. When the write protection hole 22 is closed by the write protection tab 19, the large-capacity FD 10 is put into a write enable state. When the write protection hole 22 is opened by the write protection tab 19, the large-capacity FD 10 is put into a write disable state.

The illustrated large-capacity FD 10 shows a case where there is two types of storage capacity of, for example, 128 megabytes and 256 megabytes. In the vicinity of the write protection hole 22, a large-capacity identifier hole 26 is bored in the jacket of the large-capacity FD 10. The large-capacity identifier hole 26 is for identifying the large-capacity FD 10 in distinction from the small-capacity FD 10' (FIGS. 2A and 2B). In addition, a type identifier hole 27 is selectively bored in the jacket of the large-capacity FD 10 near the write protection hole 22 together with the large-capacity identifier hole 26. The type identifier hole 27 is for identifying a type of the large-capacity FD 10. It is possible to identify the type of the large-capacity FD 10 according to the presence or absence of the type identifier hole 27. It is assumed that the large-capacity FD 10 having the storage capacity of 128 megabytes is referred to as a first type of the large-capacity FD while the large-capacity FD 10 having the storage capacity of 256 megabytes is referred to as a second type of the large-capacity FD. In the example being illustrated, the type identifier hole 27 is not bored in the jacket of the first type of the large-capacity FD while the type identifier hole 27 is bored in the jacket of the second type of the large-capacity FD.

As is apparent from FIGS. 2A and 2B, the large-capacity identifier hole 26 and the type identifier hole 27 are not bored in the jacket of the small-capacity FD 10'.

Turning back to FIG. 5 in addition to FIGS. 6A and 6B, on the printed-circuit board 92 mounted on the back surface of the main frame 81, the high-density/low-density compatible type FDD further comprises a switch unit 50 at a corner position in rear and left-hand side with respect to the insertion direction C. The switch unit 50 comprises a plurality of push switches which will presently be described. The switch unit 50 is for detecting the presence or absence of the write protection hole 22, the large-capacity identifier hole 26, and the type identifier hole 27.

More specifically, the switch unit 50 comprises, as the push switches, a write control switch 51, a large-capacity detecting switch 52, and a type detecting switch 53. The write control switch 51 is a push switch for detecting the opening or closing state of the write protection hole 22. The write control switch 51 is disposed at a position corresponding to the write protection hole 22 when the large-capacity FD 10 is loaded in the high-density/low-density compatible type FDD. The large-capacity detecting switch 52 is a push switch for detecting whether the loaded flexible disk is the large-capacity FD 10 or the small-capacity FD 10'. The large-capacity detecting switch 52 is disposed at a position corresponding to the large-capacity identifier hole 26 when the large-capacity FD 10 is loaded in the high-density/low-density compatible type FDD. The type detecting switch 53 is a push switch for detecting the presence or absence of the type identifier hole 27. The type detecting switch 53 is disposed at a position corresponding to the type identifier hole 27 when the large-capacity FD 10 is loaded in the high-density/low-density compatible type FDD.

As shown in FIGS. 6A and 6B, the large-capacity FD 10 further comprises a shutter 20 at a front side thereof. The shutter 20 is silidable in the direction A in FIGS. 6A and 6B. The shutter 20 is provided with shutter windows 20a and 20b. The shutter 20 is urged by a shutter spring (not shown) like the shutter spring 21 (FIG. 1) in the closing direction A. When the shutter 20 makes sliding movement in a direction reverse to the closing direction A, the shutter windows 20a and 20b of the shutter 20 are faced to the head window 12a and 13a formed in the jacket. At this time, it is possible to access the magnetic recording medium 11 by upper and lower magnetic heads (not shown) through the shutter windows 20a and 20b.

Turning back to FIG. 5, the high-density/low-density compatible type FDD includes a shutter drive mechanism for opening and closing the shutter 20 of the large-capacity FD 10, an ejector mechanism for ejecting the large-capacity FD 10, and a carriage locking mechanism for locking a direct-acting type carriage mechanism (which will later be described) after rejection of the large-capacity FD 10.

The high-density/low-density compatible type FDD further comprises a lever unit 70 which is rotatably disposed on the main surface 81a of the main frame 81 in the vicinity of the carriage 85. Specifically, the lever unit 70 comprises en eject lever 71 and lock lever 72. The eject lever 71 serves both as a component of the shutter drive mechanism for opening and closing the shutter 20 and as a component of the ejector mechanism for ejecting the large-capacity FD 10 from the high-density/low-density compatible type FDD. The lock lever 72 is located in the vicinity of the direct-acting type carriage mechanism and serves to lock the direct-acting type carriage mechanism upon ejection of the large-capacity FD 10.

The ejector mechanism comprises an eject bottom 54 projecting into an outer surface of a front panel (not shown) of the high-density/low-density compatible type FDD, an eject plate 55 for positioning the large-capacity FD 10 loaded through an insertion slot (not shown) of the front panel so that one surface of the large-capacity FD 10 is faced to the eject plate 55, and a pair of eject springs (not shown) having one end engaged with the eject plate 55 and the other end engaged with a disk holder unit (not shown). The eject plate 55 has a rack 55a at its top end in a depth direction. The rack 55a is engaged with a pinion (not shown) rotatably supported on the main surface 81a of the main frame 81. The lever unit 70 is urged by a spring mechanism 73 in a counterclockwise direction.

It is assumed that the large-capacity FD 10 is loaded into the disk holder unit of the high-density/low-density compatible type FDD. Specifically, when the large-capacity FD 10 is inserted in the direction depicted at the arrow C in FIG. 5, a top end 71a of the eject lever 71 is engaged with an upper end 20a of a right side edge of the shutter 20. With the movement of the large-capacity FD 10 in the insertion direction C, the lever unit 70 is rotated in a clockwise direction. Consequently, the shutter 20 is forced by the top end 71a of the eject lever 71 to make sliding movement in the direction reverse to the closing direction A.

When the large-capacity FD 10 is completely received in the disk holder unit of the high-density/low-density compatible type FDD, the disk holder unit comes down and then the large-capacity FD 10 is locked by a disk lock mechanism (not shown) to be stably held in the disk holder unit. In this state, engagement between side arms (not shown) of the carriage assembly and the disk holder unit is released and the shutter window 20a of the shutter 20 is located directly above the head windows 12a and 13a of the jacket, as illustrated in FIG. 6A. Accordingly, the upper and the lower magnetic heads are in contact with the magnetic recording medium 11 of the large-capacity FD 10 through the shutter windows 20a and 20b of the shutter 20 and the head windows 12a and 13a of the jacket. The shutter 20 is urged by the shutter spring to be located at a position indicated by a dash-and-dot line in FIG. 6A.

Turning back to FIGS. 6A and 6B, the jacket of the large-capacity FD 10 has a first notch 28 formed on a forward side thereof in the insertion direction C. The jacket of the large-capacity FD 10 further has a second notch 29 formed on a lateral side provided with the chamfered portion 25 for preventing reverse insertion (wrong insertion in the insertion direction C with respect to inside and outside and to before and behind). The second notch 29 has a particular shape and is formed at a particular position so that the second notch 29 is hooked on a reverse insertion preventing lever (not shown) of the small-density exclusive type FDD. In other words, the jacket of the small-capacity FD 10' (FIG. 1) does not have the first and the second notches 28 and 29.

Figure 7:
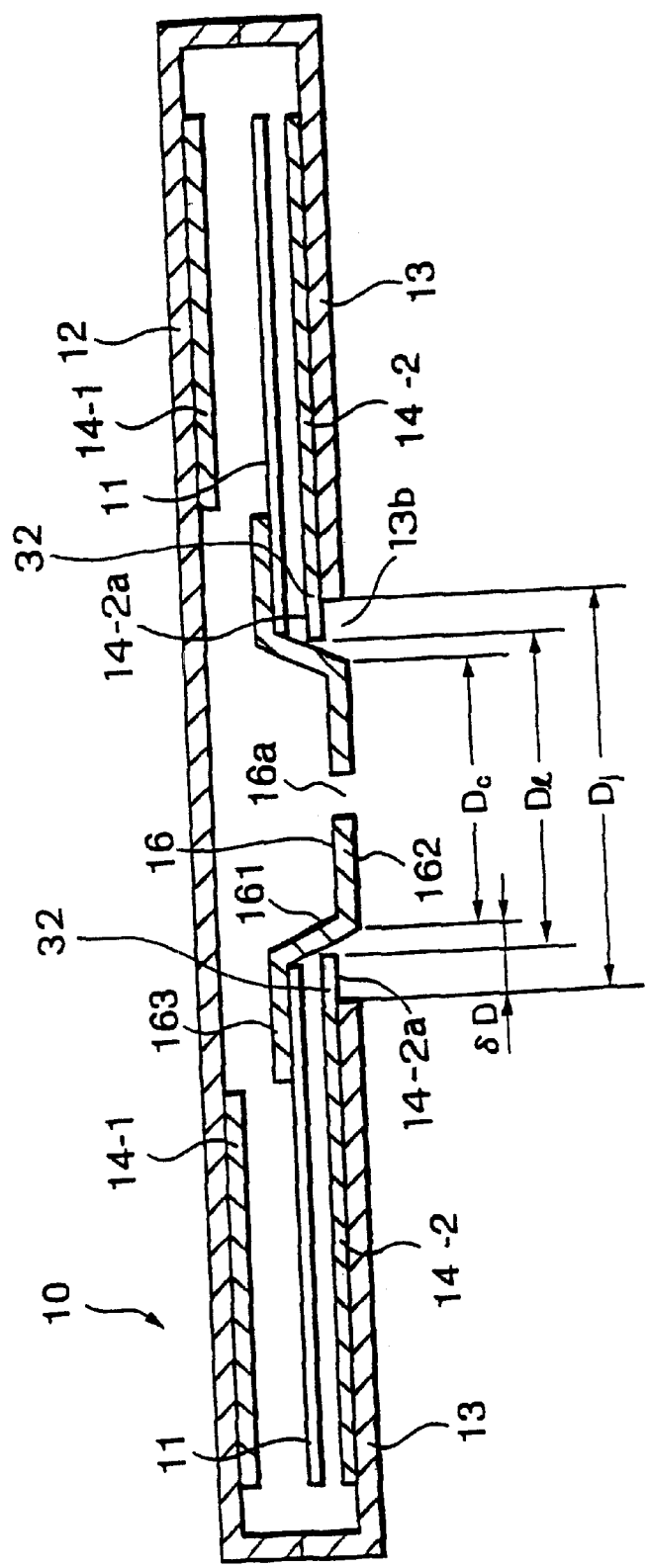
FIG. 7 is a sectional view of the large-capacity FD illustrated in FIGS. 6A and 6B.

Referring to FIG. 7, the description will proceed to the large-capacity FD 10 according to a first embodiment of this invention in more detail. The illustrated large-capacity FD 10 comprises a lower liner 14-2 having an inner peripheral part 14-2a which is extended to the gap δD between the metal hub 16 and the jacket center circular hole 13b and which has slits 32 in a radial manner as shown in FIGS. 6B.

In the manner described above, inasmuch as the inner peripheral part 14-2a of the lower liner 14-2 has the slits 32 in the radial manner, a movement of the metal hub 16 is not regulated. Accordingly, although the inner peripheral part 14-2a of the lower liner 14-2 is brought near the cylindrical portion 161 of the metal hub 16 as much as possible, a chucking error or the like does not occur and no problem arises. That is, the liner opening diameter $D_l$ of the lower liner 14-2 is smaller than the jacket opening diameter $D_j$ of the jacket center circular hole 13b and it is possible to bring the liner opening diameter $D_l$ of the lower liner 14-2 near the cylindrical outer diameter $D_c$ of the metal hub 16 as much as possible.

As a result, although the magnetic recording medium 11 of the large-capacity FD 10 is rotated at the high rotation speed, it is possible to prevent dust from intruding in the jacket of the large-capacity FD 10 via the jacket center circular hole 13b. Accordingly, it is possible to prevent the magnetic recording medium 11 from wounding. In addition, inasmuch as the jacket center circular hole 13a is substantially filled up by the inner peripheral part 14-2a of the lower liner 14-2, it is possible to prevent dust from intruding in the jacket of the large-capacity FD 10 via the jacket center circular hole 13b in a state where the large-capacity FD 10 is left as it is.

Figure 8:
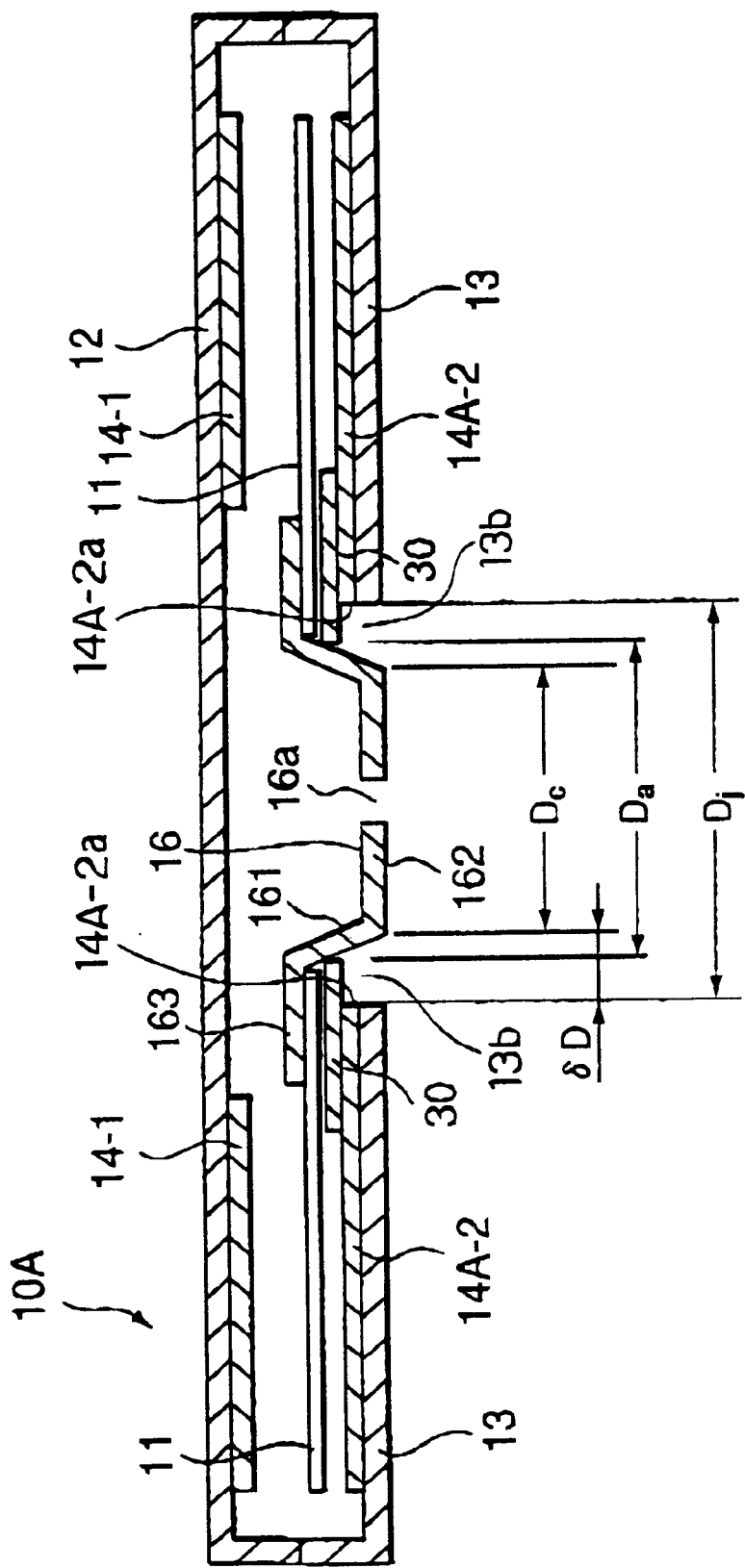
FIG. 8 is a sectional view of a flexible disk (large-capacity FD) according to a second embodiment of this invention.

Referring to FIG. 8, the description will proceed to a large-capacity FD 10A according to a second embodiment of this invention. The illustrated large-capacity FD 10A comprises a lower liner 14A-2 having an inner circumferential edge 14A-2a which is extended up to an outer circumferential edge of the jacket center circular hole 13a. However, on the lower liner 14A-2 is freely mounted an annular auxiliary liner 30 which extends to the gap δD between the metal hub 16 and the jacket center circular hole 13b. The auxiliary liner 30 is made of material such as nonwoven fabric, paper, polyethylen terephtalate (PET), or the like.

Inasmuch as the auxiliary liner 30 is merely freely mounted on the lower liner 14A-2 without being fixed on the lower liner 14A-2, it is possible to bring an inner circumferential edge of the auxiliary liner 30 near the cylindrical portion 161 of the metal hub 16 as much as possible without regulating a movement of the metal hub 16. That is, a liner inner circumferential diameter $D_a$ of the auxiliary liner 30 is smaller than the jacket opening diameter $D_j$ of the jacket center circular hole 13b and it is possible to bring a liner inner circumferential diameter $D_a$ of the auxiliary liner 30 near the cylindrical outer diameter $D_c$ of the metal hub 16 as much as possible.

As a result, in the manner as the above-mentioned embodiment, although the magnetic recording medium 11 of the large-capacity FD 10A is rotated at the high rotation speed, it is possible to prevent dust from intruding in the jacket of the large-capacity FD 10A via the jacket center circular hole 13b. Accordingly, it is possible to prevent the magnetic recording medium 11 from wounding. In addition, inasmuch as the jacket center circular hole 13a is substantially filled up by the auxiliary liner 30, it is possible to prevent dust from intruding in the jacket of the large-capacity FD 10A via the jacket center circular hole 13b in a state where the large-capacity FD 10A is left as it is.

While this invention has thus far been described in conjunction with preferred examples thereof, it will now be readily possible for those skilled in the art to put this invention into various other manners. For example, the flexible disk may be provided with a member for substantially filling up the gap δD between the metal hub 16 and the jacket center circular hole 13b without regulating a movement of the metal hub 16.

What is claimed is:

1. A flexible disk comprising a generally disk-shaped sheet-like magnetic recording medium, a jacket consisting of upper and lower shells for receiving said magnetic recording medium so that said magnetic recording medium is rotatable, and generally annular upper and lower liners attached to inner surfaces of said upper and said lower shells, respectively, said magnetic recording medium being provided with a rotation supporting metal hub attached to a center portion thereof, said lower shell being provided with a jacket center circular hole to expose said metal hub on the exterior of said jacket, wherein:

said lower liner has an inner peripheral part which is extended to a gap between said metal hub and said jacket center circular hole, said inner peripheral part having slits in a radial manner.

* * * * *